US007017116B2

(12) United States Patent
Elsbree et al.

(10) Patent No.: US 7,017,116 B2
(45) Date of Patent: Mar. 21, 2006

(54) GRAPHICAL HUMAN-MACHINE INTERFACE ON A PORTABLE DEVICE

(75) Inventors: Christopher N. Elsbree, Plainville, MA (US); Ioannis S. Apostolakis, Mansfield, MA (US); James Phelps, Worcester, MA (US)

(73) Assignee: Iconics, Inc., Foxborough, MA (US)

( * ) Notice: Subject to any disclaimer, the term of this patent is extended or adjusted under 35 U.S.C. 154(b) by 0 days.

(21) Appl. No.: 09/478,775

(22) Filed: Jan. 6, 2000

(65) Prior Publication Data

US 2003/0107588 A1    Jun. 12, 2003

Related U.S. Application Data

(60) Provisional application No. 60/114,882, filed on Jan. 6, 1999.

(51) Int. Cl.
    *G06F 3/00* (2006.01)
(52) U.S. Cl. ..................................................... 715/740
(58) Field of Classification Search ................ 345/700, 345/733, 734–743, 760–763, 804, 805, 853; 379/201.4, 90.01, 221.15; 707/10, 4; 713/169, 713/154; 709/206, 248; 700/3, 82; 715/740
    See application file for complete search history.

(56) References Cited

U.S. PATENT DOCUMENTS

| | | |
|---|---|---|
| 4,141,066 A | 2/1979 | Keiles |
| 5,652,908 A | 7/1997 | Douglas et al. ............. 395/800 |
| 5,671,415 A | 9/1997 | Hossain |
| 5,726,912 A | 3/1998 | Krall, Jr. et al. |
| 5,727,202 A * | 3/1998 | Kucala ........................ 707/10 |
| 5,781,720 A * | 7/1998 | Parker et al. ................. 714/38 |
| 5,812,668 A | 9/1998 | Weber |
| 5,815,657 A | 9/1998 | Williams et al. |
| 5,818,447 A | 10/1998 | Wolf et al. |
| 5,828,674 A | 10/1998 | Proskauer .................. 371/22.1 |
| 5,828,840 A | 10/1998 | Cowan et al. |
| 5,835,914 A | 11/1998 | Brim |
| 5,850,446 A | 12/1998 | Berger et al. |

(Continued)

FOREIGN PATENT DOCUMENTS

EP         0 266 784 A2    5/1988

(Continued)

OTHER PUBLICATIONS

Fitzgerald et al., "Evaluating Alternative Display Sharing System Architectures", Apr. 19, 1991,IEEE Xplore 1.8, pp. 145-157.*

(Continued)

*Primary Examiner*—Kristine Kincaid
*Assistant Examiner*—Lê Nguyen

(57) ABSTRACT

A software development toolkit automates and eases the task of generating graphical human-machine interfaces that are interactive control modules or software necessary to control a process. A graphical human-machine interface is created on a computer using a first operating system. The graphical human-machine interface can be operated on a portable computing device that uses an operating system that is less capable than the first operating system. The graphical human-machine interface process control modules allow a user to control a process by using the portable computing device as a user control station. The operation of the graphical human-machine interface process control software on the portable computing device can be simulated on the computer that uses the first, more capable operating system. The portable computing device can be a handheld portable computing device. The second, less capable operating system can be Windows CE.

8 Claims, 13 Drawing Sheets

U.S. PATENT DOCUMENTS

| | | | |
|---|---|---|---|
| 5,867,153 A * | 2/1999 | Grandcolas et al. | 345/700 |
| 5,889,516 A * | 3/1999 | Hickey et al. | 345/740 |
| 5,910,895 A | 6/1999 | Proskauer et al. | |
| 5,938,781 A | 8/1999 | Proskauer | |
| 6,032,203 A | 2/2000 | Heidhues | |
| 6,131,122 A | 10/2000 | Sampson | |
| 6,141,005 A * | 10/2000 | Hetherington et al. | 345/733 |
| 6,151,625 A | 11/2000 | Swales et al. | |
| 6,188,401 B1 * | 2/2001 | Peyer | 345/805 |
| 6,226,633 B1 * | 5/2001 | Hartikainen et al. | 707/4 |
| 6,259,448 B1 * | 7/2001 | McNally et al. | 345/733 |
| 6,313,851 B1 * | 11/2001 | Matthews, III et al. | 345/717 |
| 6,330,005 B1 * | 12/2001 | Tonelli et al. | 345/734 |
| 6,341,306 B1 * | 1/2002 | Rosenschein et al. | 709/217 |
| 6,349,410 B1 * | 2/2002 | Lortz | 725/110 |
| 6,380,959 B1 * | 4/2002 | Wang et al. | 345/853 |
| 6,389,464 B1 | 5/2002 | Krishnamurthy et al. | |
| 6,441,834 B1 * | 8/2002 | Agassi et al. | 345/764 |
| 6,456,307 B1 * | 9/2002 | Bates et al. | 345/838 |
| 6,466,203 B1 * | 10/2002 | Van Ee | 345/173 |
| 6,477,565 B1 * | 11/2002 | Daswani et al. | 709/217 |
| 6,509,913 B1 * | 1/2003 | Martin et al. | 345/762 |
| 6,590,588 B1 * | 7/2003 | Lincke et al. | 345/744 |

FOREIGN PATENT DOCUMENTS

| | | |
|---|---|---|
| EP | 0 460 308 A1 | 12/1991 |
| EP | 0 566 283 A2 | 10/1993 |
| EP | 0 762 273 A1 | 3/1997 |
| EP | 0 778 688 A2 | 6/1997 |
| EP | 0 810 499 A2 | 12/1997 |
| EP | 0 825 506 A2 | 2/1998 |
| WO | 97/00475 | 1/1997 |

OTHER PUBLICATIONS

Dolan et al., "X Window System Servers in Embedded Systems", Mar. 2, 1990,IEEE Xplore 1.8, pp314-319.*

B. Anger, Windows NT an d95 OSs, OPC, ActiveX, and RAD Tools Shape Course of OL Software, I & CS Industrial and Process Control Magazine, vol. 69, Nov. 1996, pp. 49-54.

E. Bassett, Making the OPC Connection, Start Magazine vol. 2 No. 4, Jul./Aug. 1998, downloaded Feb. 24, 1999 from http://www.startmag.com/v2n4opcp002.htm, 3 pages.

M. Edmond, Efforts Advance to Tie Shop-Floor Automation to Back-Office Systems, Start Magazine, vol. 2 No. 1, Jan./Feb. 1998, downloaded Feb. 24, 1999 from http://www.startmag.com/v2nlopc1.htm, 6 pages.

M. Edmund, 51 Companies were selected as The Hottest Companies in 1998 after months of deliberation by a panel of start's editors, Start Magazine vol. 2 No. 4, Jul./Aug. 1998, downloaded Feb. 24, 1999 from http://www.startmag.com/v2n4p030.htm#ICONICS, 23 pages.

ICONICS DataWorX32, OPC Redundancy & Bridging, http://www.iconics.com/Genesis32/DataworX_99.htm, printed Oct. 15, 1999.

Microsoft Corporation, COM Technologies Home Page, downloaded Mar. 12, 1998 from http://www.microsoft.com/com/comintro.htm, 1 page.

National Instruments: "Graphical Programming for PC Automation"Instrupedia 97. Your Interactive Encyclopedia for Instrumentation, vol. 2, No. 1, 1997 pp. 6-21 to 6-28, XP-002132205.

National Instruments, OPC - Frequently Asked Questions, downloaded Mar. 12, 1998 from http://www.natinst.com/automation/opc_faq.htm, 2 pages.

OPC Programmers'Connection, History of OPC, downloaded Mar. 12, 1998 from http://www.dspace.dial.pipex.com/town/estate/dn50/history.shtml, 2 pages.

OPC Tool WorX, downloaded Mar. 12, 1998 from http://www.iconics.com/opc/toolw2.htm, 3 pages.

What is OPC?, downloaded Mar. 12, 1998 from http://www.iconics.com/opc/what_opc.htm, 1 page.

Press Release, ICONICS GraphWorX32 Awarded Prestigious Control Engineering 1997 Editors'Choice Award, Feb. 27, 1998, downloaded Mar. 12, 1998 from http://www.iconics.com/CE97awrd.htm, 2 pages.

S. Robinson and A. Krasilshchikov, ActiveX Magic: An ActiveX Control and DCOM Sample Using ATL, May 1997, downloaded Mar. 12, 1998 from http://www.microsoft.com/com/overview.htm, 11 pages.

J. Schmoll, Wird OLE for Process Control (OPC) Ein Neuer Industriestandard ?, Automatisienungstechnische Praxis-ATP, vol. 39, May 1997, pp. 14-17.

Shepard et al., How MFC Does Activex Connections, Dr. Dobbs Journal, vol. 22, Apr. 1997, pp. 109-113.

A. Shrotriya: "Using Object Linking and Embedding (Ole) Automation in Labview 4.0" National Instruments, Application Note 081, XP-002132206.

Vertical Industry Specifications Supported in Windows DNA, http://www.microsoft.com/Dna/industry/vertical.asp, printed Oct. 18. 1999.

Welcome to Iconics, OPC-To-The-Core http://www.iconics.com/index2.htm, printed Oct. 18, 1999.

P. Wiedenberg, ActiveX Technology Optimizes Process Visualization, Engineering and Automation, vol. 20, Jan. 1998, pp. 36-37.

International Search Report, PCT/US99/05534, 7 pages, Jul. 6, 1999.

* cited by examiner

GRAPHICAL HUMAN-MACHINE INTERFACE ON A PORTABLE DEVICE

CROSS-REFERENCE TO RELATED CASE

This is based on and claims priority to and the benefit of Provisional U.S. Patent Application Ser. No. 60/114,882, filed on Jan. 6, 1999, the entirety of which is hereby incorporated herein by reference.

TECHNICAL FIELD

The invention relates to the development, creation, and use of software for process control, and more particularly to graphical human-machine interface process control software that is executable on a portable computing device.

BACKGROUND INFORMATION

Process control relates to the control of the parameters of a process, such as a manufacturing process. The parameters can include duration, temperature, pressure, speed, quantity, and/or direction of motion, for example. In other processes, such as in those performed in the course of using and maintaining information systems, management systems, and the like, the parameters can relate to paper documents or machine-readable media, or to intangible quantities such as units of time or units of money such as a credit limit, or to a result such as can be created by a printer, a visual display module, or an aural signal. Process control systems can be used to help manage production, monitor and maintain equipment, and/or perform business functions such as maintaining inventory records, performing accounting, and tracking sales.

SUMMARY OF THE INVENTION

In general, in a conventional process control system, a person who wants to monitor and/or control a process is required to use a device that is connected to or networked into the process control system. Such interconnected or networked devices are usually capable of using an operating system that is identical to, or comparable in capability to, the operating system of principal control unit(s) of the system. It has been difficult to employ portable control devices, and in particular, handheld portable control devices, in such process control systems because the computational power and capability of such portable devices in general is less than that found in principal control units, such as desktop computers. Typically, portable devices that interact with computerized process control systems have only partial functionality (as for example, a portable unit that generates receipts upon the return of a rental car or logs signatures upon the delivery of a package) and can perform only a few of the functions that a desktop computer used to control the same process can perform.

Modern process control equipment, such as that used to operate a manufacturing process, generally employs one or more desktop computers as principal control units. Such computers are needed in order to provide the computational speed and power required to control a process, which can involve a significant number of machines or processing stations. Desktop computers also are needed to provide the capability to log data from the process, to perform associated calculations, and to generate reports about the process status and output in a timely manner.

A software development toolkit according to the invention automates and eases the task of generating graphical human-machine interfaces that can be operated on portable computing devices that use an operating system that is less capable than the operating system used by the computer that was employed to create the graphical human-machine interface. The toolkit allows the production of real-time graphical human-machine interactive control modules or software necessary to control a process with one or more portable computing devices.

In one aspect, the invention features a method of creating a graphical human-machine interface. The method includes the steps of providing a computer that uses a first operating system (such as a desktop client or server computer running the Windows operating system such as Windows 98 or Windows NT), and providing a portable computing device that can communicate with the computer. The portable computing device uses a second operating system that is less capable than the first operating system. The method further includes the steps of generating on the computer a graphical human-machine interface that is operable on the portable computing device, and transferring the graphical human-machine interface from the computer to the portable computing device.

Embodiments of this aspect of the invention can have the following features. For example, the method can further comprise, after generating the graphical human-machine interface, the step of simulating on the computer the operation of the graphical human-machine interface as it would appear on the portable computing device. The method can further comprise the steps of operating the graphical human-machine interface on the portable computing device, and transmitting between the computer and the portable computing device information related to the operation of the graphical human-machine interface. The graphical the human-machine interface can be adapted to control at least one process parameter. The step of generating a graphical human-machine interface can comprise generating on the computer a graphical human-machine interface operable on the portable computing device, the graphical human-machine interface comprising a processor-independent graphical human-machine interface object and a provided run-time engine specific to a selected processor present on the portable computing device. The second operating system can be Windows CE. The portable computing device can be a handheld portable computing device, such as a personal digital assistant (PDA), for example a Sharp Mobilion 5000 or 4500, a NEC 770 or 800, or a Casio Cassiopeia E-15 Palm PC, or a handheld computer, for example a Hewlett-Packard Jornada Palmtop.

In another aspect, the invention features a computer program recorded on a machine-readable medium. The program includes a module that operates on a computer to allow a user of the computer to generate a graphical human-machine interface that is operable on a portable computing device. The computer uses a first operating system and the portable computing device uses a second operating system having less capability than the first operating system. The computer program further comprises a module that operates on the computer to simulate the operation of the graphical human-machine interface on the portable computing device and a module that operates on the computer to transfer, from the computer to the portable computing device, the graphical human-machine interface.

Embodiments of this aspect of the invention can have the following features. For example, the computer program can further comprise a module that operates on the computer to transfer, between the computer and the portable computing device, information related to the operation of the human-machine interface. The graphical human-machine interface can be a graphical human-machine interface for process control. The graphical human-machine interface can be a processor-independent graphical human-machine interface object and a run-time engine specific to a selected processor. The second operating system can be Windows CE. The portable computing device can be a handheld portable computing device.

In still another aspect, the invention features a method of controlling a process. The method includes the steps of providing a computer that uses a first operating system, and providing a portable computing device in communication with the computer. The portable computing device uses a second operating system that is less capable than the first operating system. The method includes the additional step of providing a graphical human-machine interface that is operable on the portable computing device. The graphical human-machine interface is generated on the computer. The method include the further steps of operating the graphical human-machine interface on the portable computing device and exchanging information between the computer and the portable computing device, so as to control at least one parameter of a process.

Embodiments of this aspect of the invention can have the following features. For example, the step of operating graphical human-machine interface can comprise operating the graphical human-machine interface on the portable computing device to display both graphical information and alphanumeric information. The second operating system can be Windows CE. The portable computing device can be a handheld portable computing device.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being based upon illustrating the principles of the invention.

DESCRIPTION

Figure 1:
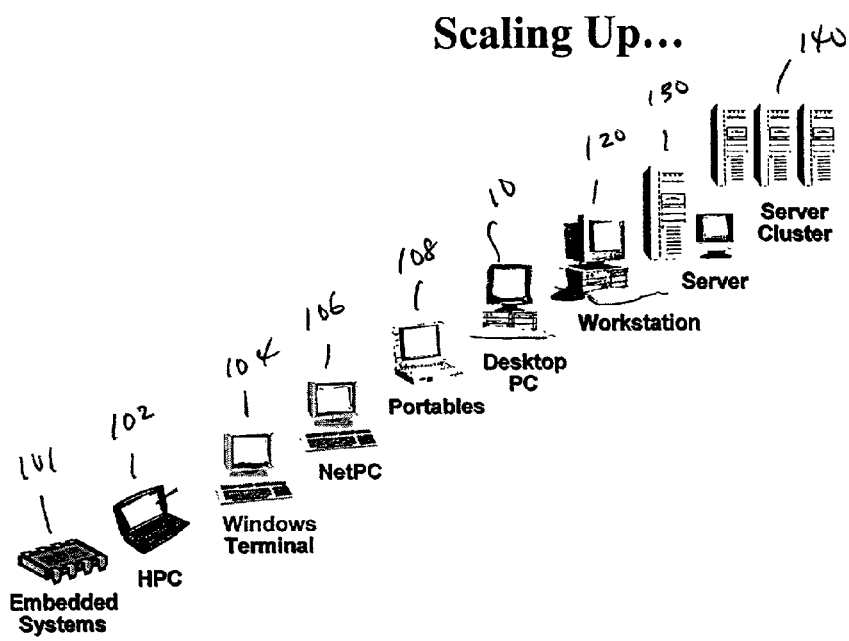
FIG. 1 is a schematic overview of an array of computer systems ranging from small scale systems such as embedded systems to large scale systems such as server clusters.

This invention relates generally to graphical human-machine interface process control software, to the method of use of the software, and the method of use of a toolkit that at least partially automates the production of the software.

One embodiment of the invention is a software toolkit for the rapid development, in a visual development environment that does not require the developer to write an application program using a low-level programming language such as C or C++, of custom human-machine interfaces for execution on Windows CE-based devices such as a palmtop computer. The toolkit has two components. One component is a configuration part that runs on a full-sized PC and allows the developer to configure visually, without writing any software code, human-machine interfaces such as a graphical animation used to visualize process data including, for example, user input controls like buttons, sliders, and numeric entry fields. The human-machine interfaces thus configured and created on the full-sized PC are downloaded as files to the target Windows CE-based device. The other component of the toolkit is a runtime engine that is resident and runs on the Windows CE-based device. The runtime engine accesses the downloaded human-machine interface files and executes the human-machine interfaces contained in the files to display and animate the human-machine interfaces on the screen of the Windows CE-based device. The human-machine interfaces creatable, downloadable, and executable with the toolkit preferably are compliant with Microsoft's OLE for Process Control (OPC) communication specification, which is the standard communication specification for the process control industry.

Different manufacturers of Windows CE devices use different central processor unit ("CPU") architectures, of which the most common CPUs are SH3 and MIPS. In general, a program compiled to be executable on a particular CPU will not execute correctly, or at all, on another CPU of different architecture because the CPUs have different machine language instruction sets. In order to accommodate the variety of CPU types that can be present in a process control system, a number of different runtime engines are available for the graphical human-machine interface process control software, all of which work with the hardware independent portion of the graphical human-machine interface process control software that is custom-designed for the specific process that is to be controlled. Given the appropriate runtime engine for each piece of hardware, each piece of hardware will be capable of operating the same graphical human-machine interface process control software without any modification.

The invention relates to software capable of allowing a developer to develop visually one or more human-machine interfaces on a computer running a full-service operating system (such as Window NT, Windows 95, or Windows 98), to download those human-machine interfaces from the computer to a device running an operating system having less features and/or power (such as Windows CE), and to execute those downloaded human-machine interfaces on the device to provide animations on the screen of the device that can be utilized by a user of the device to control and/or monitor a process. With this software toolkit, one need only create a single version of a custom graphical human-machine interface that can operate on hardware having a variety of CPU types.

FIG. 1 is a schematic overview of an array of computer systems ranging from small scale systems such as embedded systems to large scale systems such as server clusters. At the small end of the spectrum there are embedded systems 101 that operate using a single chip microcontroller or microprocessor. Such systems can be preprogrammed when manufactured, or can be programmable in the field, or can have a combination of both types of programming capabilities. Embedded systems are typically quite inexpensive, can be quite small and can demand little power, can have significantly limited capabilities as compared to larger systems (as will be apparent), can be applied widely in such applications as consumer devices, and can even be considered disposable. Embedded systems can or can not have the ability to communicate with other computer systems. An example of an embedded system that does not communicate with other computer systems is the microprocessor that is used to control a household device such as a microwave oven, while an embedded system that does communicate with other computers is a computer that operates one or more systems in an automobile, such as the ignition system, that can be connected periodically to a diagnostic computer for the purposes of examining the operation and performing maintenance on the automobile. A somewhat more powerful computing device is a handheld portable computer 102, or "HPC," that can include a modest display, a keypad or other input device, and can include one or more ports for connection to a network via a cable, or a wireless connection (such as a radio frequency ("RF") connection or an infrared ("IR") connection).

Continuing along the spectrum of computer hardware in the direction of larger systems, computerized equipment that is particularly adapted to be used with networked computer systems but that is limited in capability includes, for example, a Windows terminal 104 or a NetPC 106. These computer-based devices employ the capability of other more powerful and capable computers that are connected to the same (possibly extended) network, relying for example on other more powerful computers for storage of information and for providing executable computer code or instructions on an as-needed basis so as to limit the hardware requirements, and the associated costs, of these computer-based devices.

Further along the spectrum of FIG. 1 are portable computers 108, also known as "laptops," which have many of the same features and capabilities as are found in the conventional desktop personal computer 10, or PC, but which nevertheless have inherent limitations posed by the constraints of size, weight, the provision of power by batteries or the like when used in the field, and the higher costs of displays suitable for use in a portable device as compared to conventional computer monitors. In general, laptops with capabilities equal to PCs are available at a higher unit cost.

At a high end of the spectrum of computers are workstations 120, servers 130, and clusters of servers 140, which are designed to have exceptionally high capabilities, such as high speed of operation, very large storage capability, and high speed communication capability. Such devices are typically quite expensive and are not portable. In general, a larger and faster computer will generally have the ability to use more sophisticated operating systems that place greater demands on the computational capabilities of the computer, and that can support multiple users and multiple threads. By comparison, the computer-based devices and systems at the smaller scale portion of the spectrum of FIG. 1 are in general incapable of supporting multiple users and multiple threads in a reasonable manner, and in general are not so used. There is great incentive to find methods and apparatus that will allow a user to substitute a smaller, less expensive, portable, ideally handheld, computing device for functions that until now have been amenable to operation only on larger computers. The incentives include cost savings, convenience, and the freedom of mobility while maintaining a productive situation that such portable devices can provide.

Figure 2:
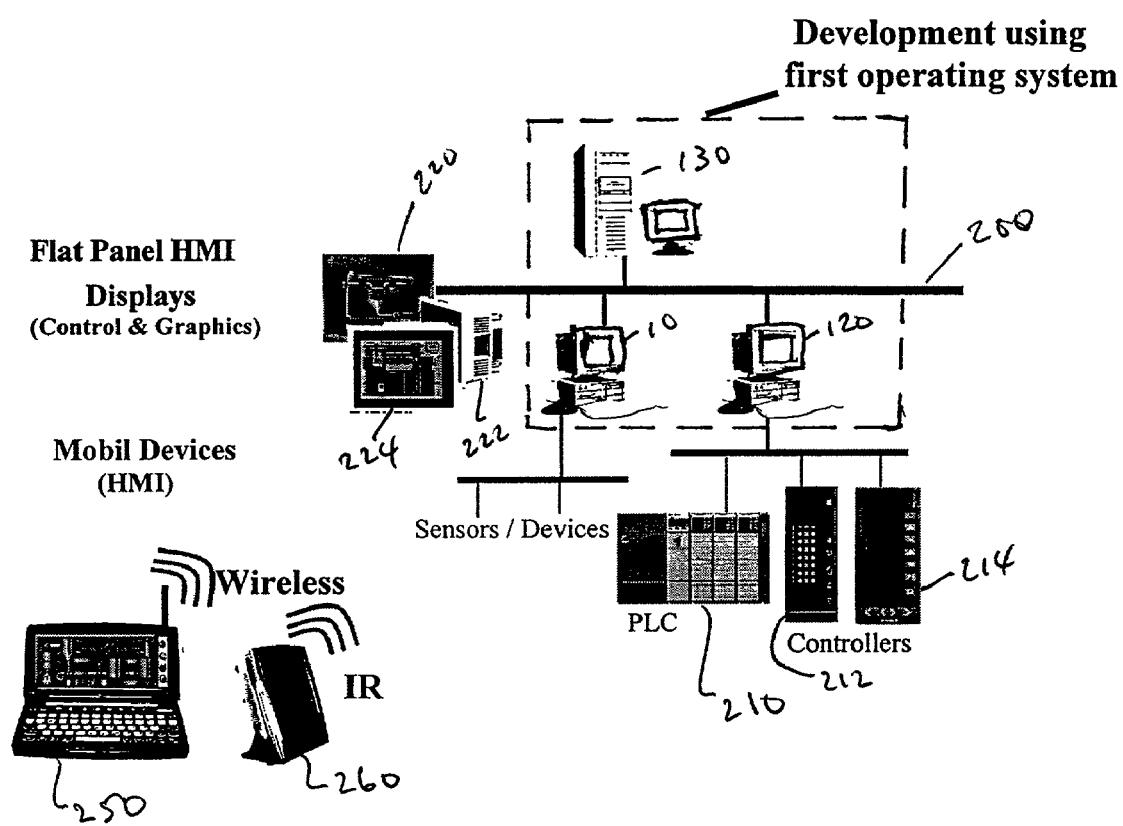
FIG. 2 is a schematic overview of an embodiment of the invention, in which a computer using a first operating system is employed to develop a graphical human-machine interface that operates on a computer using a second, less capable operating system.

FIG. 2 is a schematic overview of an embodiment of the invention, in which a computer using a first operating system is employed to develop a graphical human-machine interface that operates on a computer using a second less capable operating system than the first operating system. A number of embodiments will be discussed below.

The development of a graphical human-machine interface is done on a computer 10 for several reasons. The memory constraints of many portable computing devices mandate that executable programs be as small as possible, and limit the memory space that can be devoted to operating systems. A development tool for creating a complex human-machine interface ("HMI") generally uses too much memory to justify its presence on such a portable computing device. Furthermore, most portable computing devices have small screens and small keyboards, further complicating development. Hence, a computer 10, using a more powerful operating system, is a more appropriate development environment for custom HMIs that are intended to be operated on portable computing devices using less capable operating systems than that on the computer 10 used to develop the graphical human-machine interface. In addition, most users have more experience interacting with a full-sized (and fully functional) computer 10 and will likely be more comfortable developing process control software on one.

In FIG. 2, there is depicted an exemplary embodiment in which a computer 10 is connected via network 200 with other computers, such as the workstation 120 and the server 130, all of which can communicate with the others and can share software, data, and files with the others. In this embodiment, development of software can conveniently be carried out using any one or a combination of the computer 10, the workstation 120 and the server 130. There can be additional computers of the same or of different kinds connected to these three computers, or any of the computers shown can be omitted, so long as at least one computer is present, for example the computer 10. At least the computer 10 uses a first operating system that has certain capabilities, including the ability to conveniently allow the prototyping and development of computer code that can perform process control. For example, the operating system can be Windows 95, Windows 98, Windows 2000, or Windows NT. In other embodiments, other operating systems having full developmental capabilities can be used, such as Unix, Linux, or MacOS.

The computer 10 or the other computers on the network 200 can simulate the behavior of less powerful computers (for example an embedded computer 101, a handheld portable computer 102, or a portable computer 108) using a second operating system that has less capability than the first operating system. In particular, the computer 10 can simulate the operation of graphical human-machine interface process control software operating on a less powerful computer using a second less capable operating system. This simulation can include a demonstration of the operation of the graphical human-machine interface process control software on the less powerful computer, as to visual, auditory or other sensible manifestations that the actual operation would provide, as well as the simulation of the communication that the less powerful computer would employ in the transfer, for example over the network 200, of computer programs, computer files or code, computer data, and other information needed to accomplish process control, both as to monitoring a process and controlling the process and the machines that accomplish the process. The simulation can provide full dynamic animation, for example of the level of a fluid that changes in a vessel during the operation of a process, and can provide step-by step animation, as well as previews of the appearance and function of the graphical human-machine interface process control when it operates on the less powerful computer.

FIG. 2 further depicts an embodiment that includes sensors and devices that are attached to the network 200. These sensors and devices are part of the process control hardware. The sensors provide information about the status of the process, or process parameters, either continuously or at discrete times, which information is communicated to a computer 10 that is controlling at least a portion (e.g., is monitoring or controlling at least one parameter) of the process. There can also be dedicated control hardware, such as programmable logic controller ("PLC") 210 and controllers 212, 214 that are connected to the network 200 and that monitor and control some feature of a process. PLC 210 and controllers 212, 214 communicate bidirectionally with the computer 10 over the network 200, providing the computer 10 with information, and accepting from the computer 10 updated or revised instructions regarding the control of the process.

In addition, there can be connected to the network 200 one or more flat panel human-machine interface displays 220, 222, 224, which can be computer monitors or the like, that provide displays of the controls and graphic representations of the process and its status. These displays 220, 222, 224 can be located in positions that are conveniently observed by operators of the process or by management, in order to provide contemporary information on the process. Such displays can provide data, information regarding trends in the data (or projections of the data to future times) and can also provide alarms if the process under control exceeds satisfactory limits so that corrective action can be taken in a timely manner as required.

Even with all of the process control hardware that has been described, there can still be utility and value in having portable computing devices 250, 260 that permit the operators and managers of the process to observe the status of the process and to take necessary actions, corrective or otherwise. In the embodiment depicted in FIG. 2, there are portable computing devices 250, 260 that can communicate with the network 200 by wireless communication (e.g., portable computing device 250) and by IR (e.g., portable computing device 260). Other kinds of communication, such as a wired connection (not shown), or a radio frequency connection (not shown), can be provided to allow the portable computing devices 250, 260 to communicate over the network 200 with any of the control computers 10, 120, 130.

The communications between the portable computing devices 250, 260 are preferably carried out using a standard communication protocol, such as OPC. Many different types of the portable computing devices 250, 260 are available from a variety of manufacturers. The internal construction and operational details of such diverse devices can be quite different, making operation according to a single protocol difficult and problematic. One embodiment of the present invention that can overcome such problems involves providing the graphical human-machine interface process control software that operates on the portable computing devices 250, 260 as two portions, one of which is a processor-independent graphical human-machine interface object (e.g., a standard operating program that presents a uniform display to the user independent of the specific model of portable computing device used), and the other portion is a run-time engine specific to a selected processor (e.g., a run-time engine specific to the processor chip present in the particular portable computing device). Such software offers many advantages, including the convenience of a single display format irrespective of the hardware used, the ability to upgrade hardware simply by installing a different runtime engine on the new hardware and continuing to use the same display and communication portion of the software, and the absence of a need to develop and debug new display and communication software every time a hardware change is instituted.

In the embodiment depicted in FIG. 2, the graphical human-machine interfaces for process control that are created and employed according to the invention include the features of real-time ("live") graphical animations used to visualize process data, including the ability to interact with the process via user input controls like buttons, sliders, and numeric entry fields, the visualization of trends in the data, and the visualization of alarm conditions. Among the embodiments of the invention are the specific embodiments that include CE ToolWorX, a toolkit for the rapid development of custom human-machine-interfaces for Windows CE based devices that has been developed by ICONICS, Inc. of 100 Foxborough Boulevard, Foxborough, Mass., software modules that are produced using the CE ToolWorX toolkit, and the use of such software modules. The operator interfaces created with the toolkit utilize OPC (OLE for Process Control) compliant communications. These HMIs are designed to run within the memory/processor constraints of Windows CE devices while still providing a level of functional complexity comparable to HMIs currently available on PCs running the more powerful operating systems Windows 95/98 and Windows NT. The Windows operating systems are products of the Microsoft Corporation of Redmond, Wash.

The user can employ CE ToolWorX to create a human-machine interface application on a computer using one of the operating systems known as Windows 95, Windows 98, Windows NT or Windows 2000 ("Windows 95/98/NT/2000"). The operation of the application on a computer running Windows CE, such as a portable, or a handheld, computer, or an embedded device, can be simulated on a computer using Windows 95/978/NT/2000. The completed application, as well as other software including other ICONICS, Inc. software products, can then be downloaded to low end hand held PC's (HPC) and embedded devices, and operated under Windows CE on such devices. Some of the other ICONICS, Inc. products that can be used in conjunction with the downloaded human-machine interface are TrendWorX and AlarmWorX applications, as well as Pocket DataWorX, which can provide OPC data bridging and OPC server connectivity, and Pocket OPC DataSpy, which can provide analysis and diagnostics of OPC real-time data. TrendWorX, AlarmWorX, Pocket DataWorX, and Pocket OPC DataSpy are products of ICONICS, Inc. of 100 Foxborough Boulevard, Foxborough, Mass.

The CE ToolWorX toolkit includes the ability to save configuration files in a format specially designed for Windows CE and also the ability to convert existing HMIs designed for computers operating using Windows 95/98/NT/2000 to HMIs for Windows CE. Other features involve disabling certain functionality that is not available on Windows CE. Windows CE is a more compact operating system and consequently is more primitive than Windows 95/98/NT/2000 (i.e. there are some features in Windows 95/98/NT/2000 that are not available in the Windows CE operating system).

CE ToolWorX also provides the runtime engine for Windows CE. Some components of the Windows CE runtime engine share the same source code as the Windows 95/98/NT/2000 runtime engine, with a variety of modifications that take into consideration the reduced capability of Windows CE as compared to Windows 95/98/NT/2000. Utilizing a common code base saves development effort and ensures that maintenance of the corresponding products for different operating systems remains synchronized.

The discussion that follows of a computer used to control a process, and of a computer used to create software objects is similar to the discussion presented in co-pending U.S. Utility patent application Ser. No. 09/267,204, filed Mar. 12, 1999, which application is assigned to the assignee of the present application, and which application is incorporated herein by reference in its entirety.

Figure 3A:
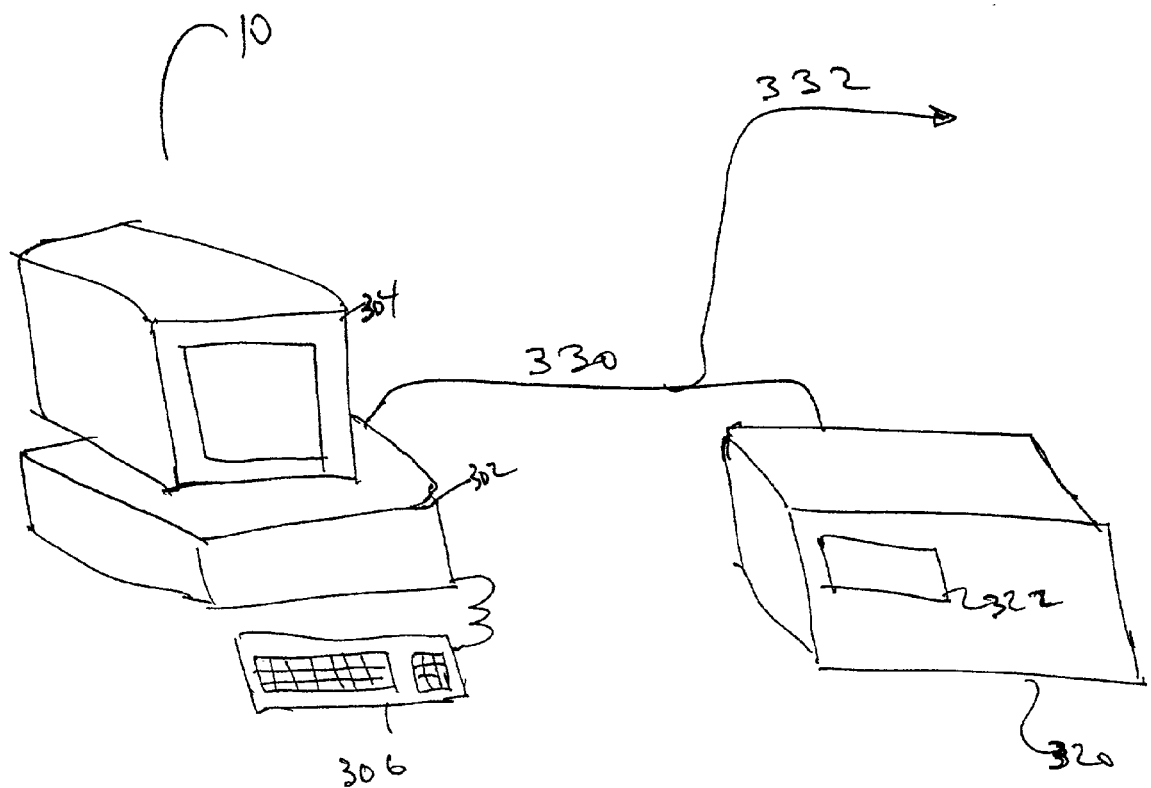
FIG. 3A is a schematic overview of an example of a process control system showing the interrelationships between and among some of the components of the system.

Referring to FIG. 3A, a computer 10 is connected via a communication bus 330 to a machine 320 that performs one or more steps in a process. The computer 10 can be a general purpose personal computer (PC) or other type of processing device. The computer 10 typically comprises a central processing unit and communication terminal 302, a display terminal 304, and an input device such as a keyboard 306. The display terminal 304 can be a touch screen display, in which case it can function as both a display device and an input device. Different and/or additional input devices can be present such as a mouse or a joystick, and different or additional output devices can be present such as a second display or a printer. The computer 10 can run any one of a variety of operating systems, such as for example, any one of several versions of Windows, or of MacOS, or of Unix, or of Linux. The communication bus 330 can have one or more branches, such as branch 332, connecting other machines, which can be a second machine of the type of the machine 320 or a different type of machine. The computer 10, operating under the control of process control software such as that which can be created by the method of the present invention, communicates with the machine 320 via the communication bus 330 using a standard communication protocol for process control, such as the Object Linking and Embedding ("OLE") for Process Control ("OPC") protocol. The OPC protocol has been defined by the OPC Foundation, and it is based on Object Linking and Embedding ("OLE") technology. Other standardized communication protocols for process control could be used as the communication protocol in other embodiments of the invention. The machine 320 can have a user interface 322 which can comprise a graphical or an alphanumeric display which can include gauges and the like and can comprise controls such as buttons, knobs, sliders, gauges and the like. For purposes of controlling the process steps performed by the machine 320, the user interface 322 of the machine 320 can be represented by a display of some or all of the user interface on the display terminal 304 of the computer 10. Just as some or all of the controls comprising the user interface 322 of the machine 320 can be available for the machine operator to inspect or adjust, so can the corresponding controls comprising the display of the user interface upon the display terminal 304 be available for inspection and adjustment. In general, some or all of the controls can be available for adjustment by an operator at the computer 10 and not available for adjustment at the machine 320, or vice versa.

Figure 3B:
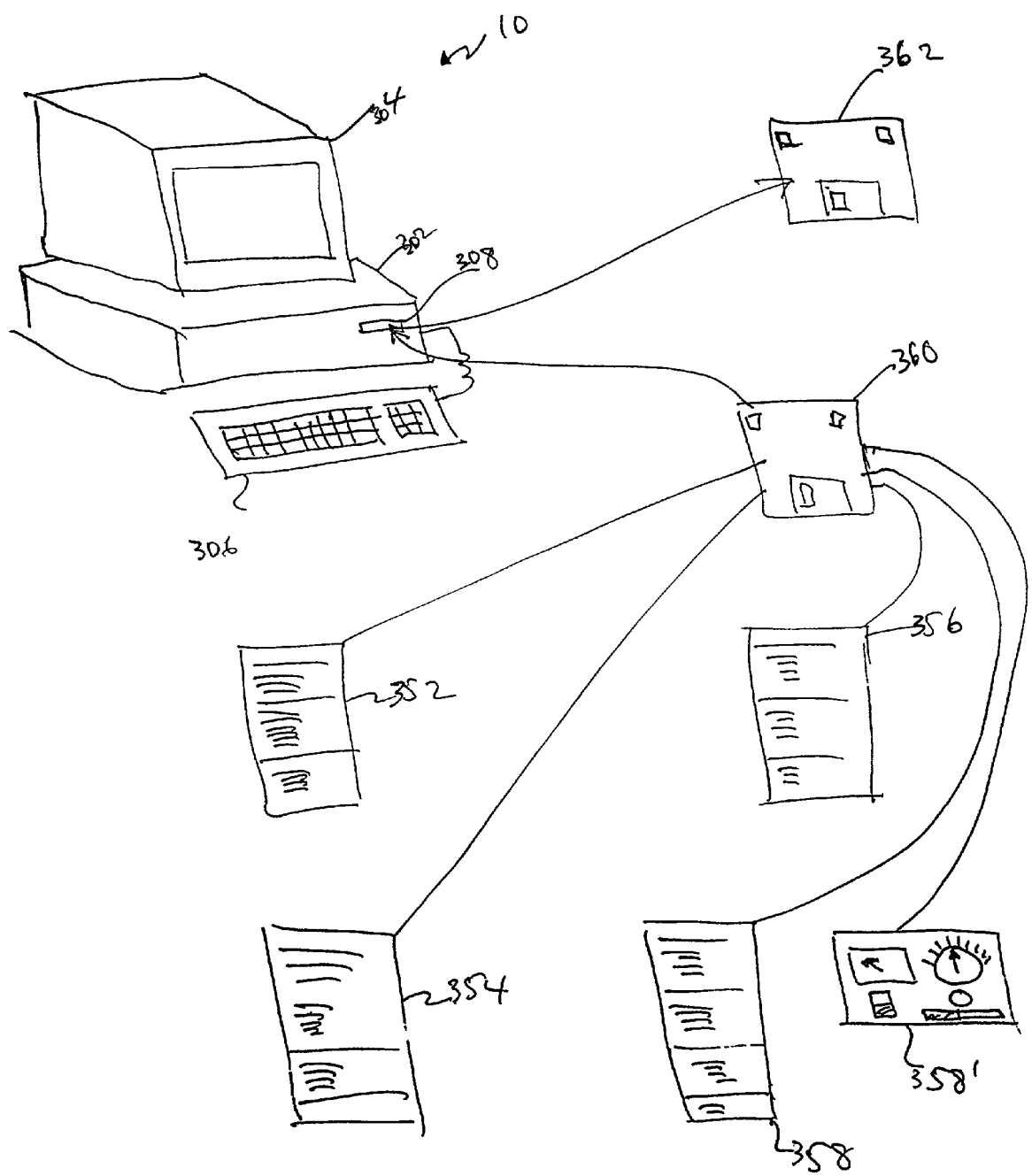
FIG. 3B depicts an example of hardware and software that can be used to create of an article of manufacture according to the invention.

FIG. 3B also depicts the computer 10, which further comprises a drive 308 that can be used to read and to write machine-readable media. The drive 308 can be a floppy disk drive, a magnetic tape drive, a CD-ROM drive, or another type of drive such as a hard drive. Various computer files, code segments, software objects and data can be provided to the computer upon machine-readable media which the computer accesses via the drive 308. The computer 10 can be one of a plurality of computers in a network, and can obtain copies of computer files, code segments, software objects and data from one or more computers in the network. Alternatively, computer files, code segments, software objects and data can be provided by an operator using an input device such as the keyboard 306. Also, portions of the necessary computer files, code segments, software objects and data can be provided by some combination of machine-readable media, by one or more computers operating in a network with the computer 10, and by operator input via an input device.

The computer files, code segments, software objects and data which are furnished to the computer 10 can be broadly divided into four categories. Information and parameters relating to the internal workings of the computer 10 are represented as computer files, code segments, software objects and data in the list 352. Information and parameters relating to the internal workings of the machine 320 are represented as computer files, code segments, software objects and data in the list 354. Information and parameters relating to the standard communication protocol for process control are represented as computer files, code segments, software objects and data in the list 356. One or more images of the user interface of the machine 320, or one or more images of the machine 320 itself, are represented as computer files, code segments, software objects and data in the list 358, or in the form of an image object 358'. The computer information and parameter list 352, the machine information and parameter list 354, the standard communication protocol for process control information and parameter list 356, and the image list 358 and/or image object 358' can be embedded on one or more floppy disks 360 and provided to the computer 10. Software can be provided to the computer 10 as machine-readable computer files, code segments, software objects and data embedded on one or more floppy disks 360. The software objects that are created by the computer can be embedded on one or more floppy disks 362. Also, the computer files, code segments, software objects and data can be made available on other machine-readable media, such as tapes, CD-ROMs, or high capacity disks such as Zip™ disks and the like, or can be retrieved directly from the memory of the computer 10 by another computer 10' (not shown) or by a portable computing device 250 (not shown).

Figure 4:
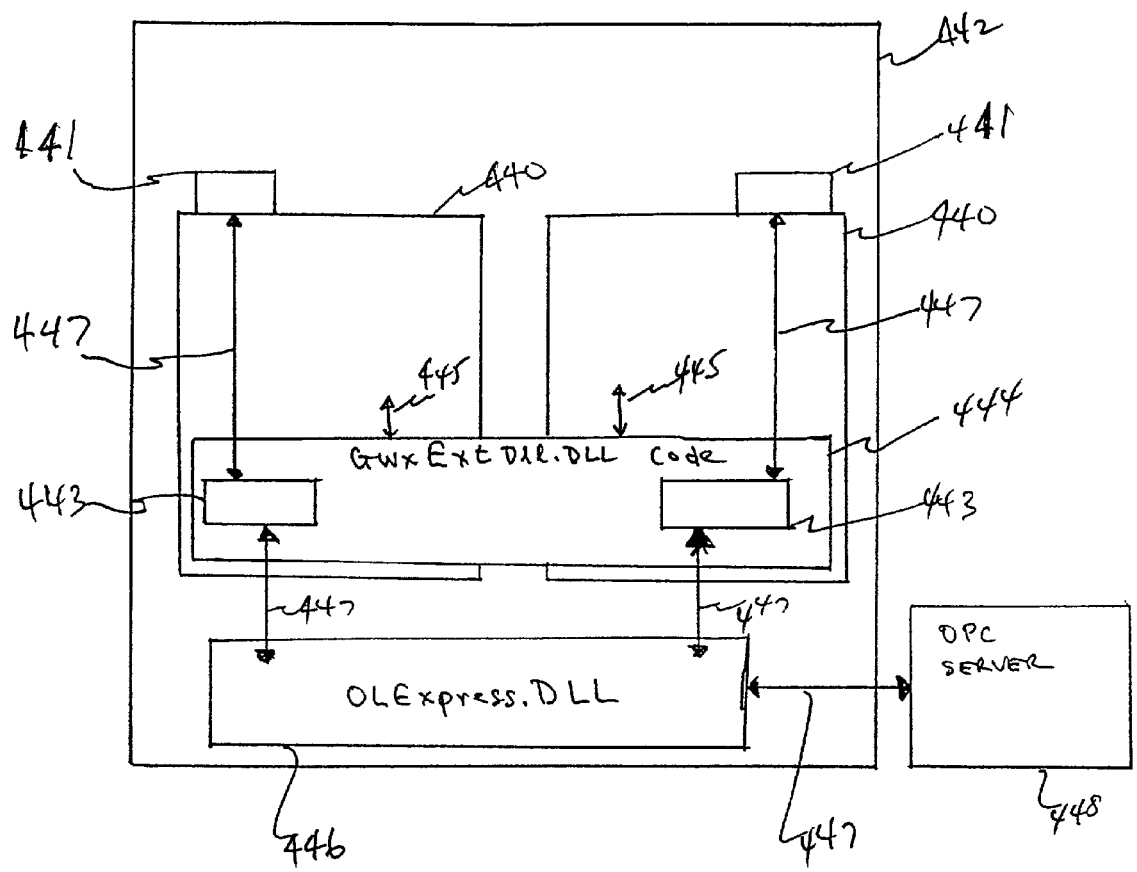
FIG. 4 depicts a schematic of the internal organization of the client side of an embodiment of the process control software that can be produced pursuant to the invention.

FIG. 4 depicts a schematic of the internal organization of the client-side of process control software objects that can be created pursuant to the invention. One or more real-time interactive control and communication software objects 440 are inserted into an application software object called a container 442. The container 442 is software that is designed to operate with objects that have interactive capabilities. In one embodiment, the real-time interactive control and communication software objects 440 are ActiveX control objects, and the container 442 is Microsoft Visual Basic. In other embodiments the container 442 can be Microsoft Internet Explorer which runs an HTML page, or ICONICS GraphWorX32, or Netscape Communicator which run an HTML page. Internet Explorer is a web browser manufactured by Microsoft Corporation, Netscape Communicator is a web browser manufactured by the Netscape Corporation, and GraphWorX32 is a software product of ICONICS Inc. used for human-machine interfaces. A real-time interactive control and communication software object 440 can give rise to one or more exemplars of the Active X control, which are called instances 441. ActiveX refers to a type of control that has been developed by Microsoft Corporation. As is familiar to those of ordinary skill in the art, these instances 441 are embedded into the container 442. Embedding as used herein denotes particularly making the real-time interactive control and communication software object 440 functional as a control through the intermediation of the container application 442, and includes the possible utilization of one or more additional software files.

In one embodiment of the present invention, two dynamic link libraries are employed to complete the interconnection of the control object 440 to an OPC server 448. These dynamic link library files are named GwxExtDll.DLL 444 and OLExpress.DLL 446. The GwxExtDll.DLL 444 provides extensions of Microsoft Foundation Classes ("MFC"). The MFC are class definitions well known to those of ordinary skill in the software arts. In operation, a copy of the GwxExtDll.DLL 444 code is loaded into the memory of the computer 10. The OLExpress.DLL 446 provides an interconnection for OPC data or signals 447 (hereinafter generally "OPC signals 447") to be communicated between an OPC server 448 and the copy of the GwxExtDll.DLL 444 code in the memory of computer 10. The OLExpress.DLL 446 links only to the GwxExtDll.DLL 444 code and not to the instance 441 of the real-time interactive control and communication software object 440. The OPC signals 447 thus pass from the OPC server 448 to the OLExpress.DLL 446 code in the memory of the computer 10, and then to the copy of the GwxExtDll.DLL 444 in memory where the information is stored in memory locations 443 associated with the specific instance 441 with which the OPC data or signals 447 are associated. The OPC signals 447 are then communicated from the respective memory locations 443 of the copy of the GwxExtDll.DLL 444 to the instances 441. The OPC signals 447 can be bidirectional. The real-time interactive control and communication software object 440 is made active through messages 445 which pass bidirectionally between the copy of the GwxExtDll.DLL 444 in memory and the real-time interactive control and communication software object 440. Equivalent communication processes can be conducted using a portable computing device 250 that is OPC compliant and that is connected as discussed below in conjunction with FIG. 5.

In one embodiment, the OPC server 448 is a virtual machine operating within the computer 10. In an alternative embodiment, the OPC server 448 operates on another computer networked with the computer 10, and communicates the OPC signals 447 via the network to the OLExpress.DLL 446 code resident in the memory of the computer 10. In either circumstance, the machine 320 which is operating within the process control system comprises an interface incorporated therein by the manufacturer or by an aftermarket upgrader which provides the capability of accepting internal signals of the machine 320 and communicating the OPC signals 447 to the OPC server 448, and the capability of accepting the OPC signals 447 from the OPC server 448 and converting them into internal signals for use within the machine 320. The list 354 referred to above with regard to FIG. 3B thus represents a list of the correspondences between the OPC signals 447 which the machine 320 provides and/or receives and the states of the controls and displays of user interface 322 of the machine 320. The computer 10 can employ the list 354 to associate at least one particular OPC signal 447 with the graphical representation of the user interface of the machine 320 which appears on the display of the computer 10.

The discussion that follows of communication of data between computers using a standard communication protocol for process control is similar to the discussion presented in co-pending U.S. Utility patent application Ser. No. 09/419,239, filed Oct. 15, 1999, which application is assigned to the assignee of the present application, and which application is incorporated herein by reference in its entirety.

Figure 5:
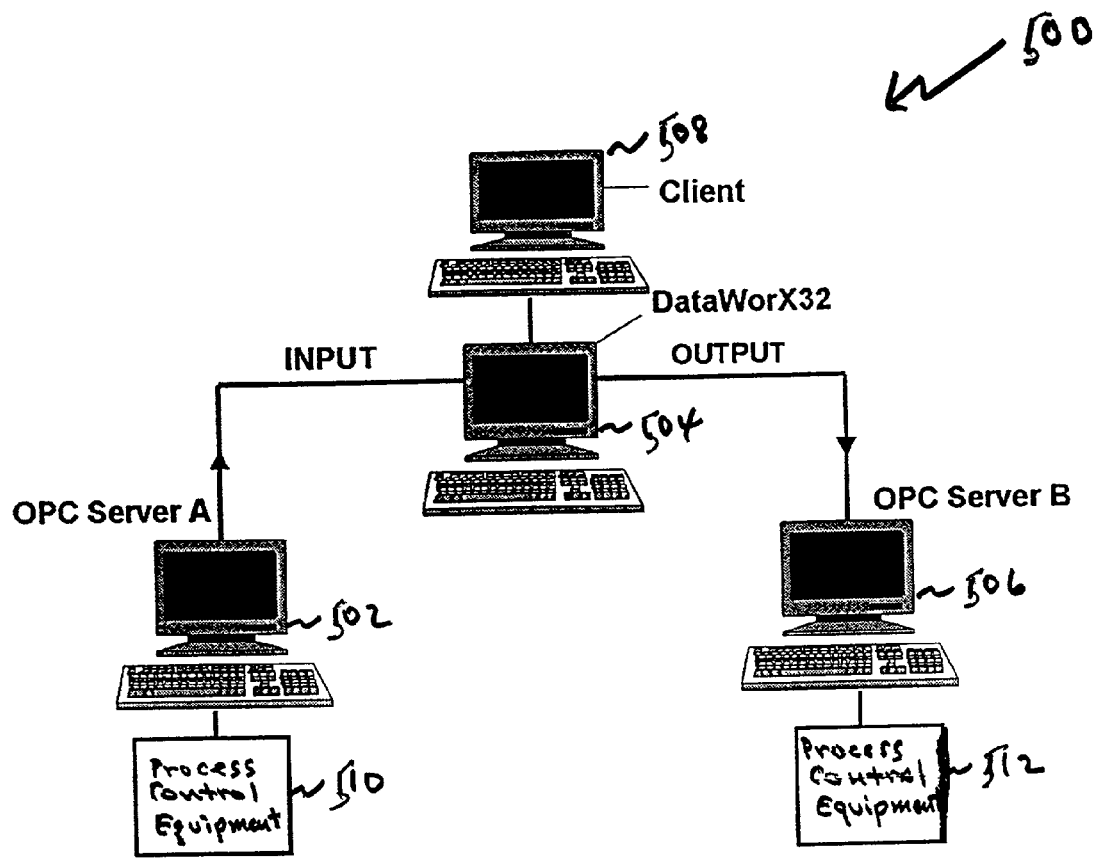
FIG. 5 depicts an embodiment of a server-to-server bridging capability that can be used in a process control system.

Referring to FIG. 5, in connection with server-to-server data bridging functionality according to the invention, a plurality of computers 502, 504, 506, 508 are interconnected. The computers 502, 504, 506, 508 can be on a computer network 500, and they can communicate over the network 500. The computers 502, 504, 506, 508 can be personal computers or workstations, or generally any other type of computing device such as minicomputers, mainframe computers, embedded computers, or other general purpose computers. In the embodiment shown, the computers have monitors and keyboards, but it should be understood that the computers could have additional or different input and output devices, such as keypads, touch screens, printers, plotters, scanners, modems, and the like, or they can have fewer input and output devices attached, as can be appropriate for a process control system. Each of the computers 502, 504, 506, 508 can run any of a variety of operating systems, such as the Windows systems mentioned above, or systems such as Unix or Linux, and each generally includes all of the basic internal components of a general purpose computer such as a microprocessor, one or more buses, one or more controllers, memory (such as RAM and ROM of any of many conventional types), input and output devices, recording systems such as hard disks, floppy disks or magnetic tape, and the like. One computer 502 is identified as "OPC Server A." This computer 502 also has a connection to a first piece of process control equipment 510, to which it can send instructions and from which it can obtain information. The computer 502 and the first piece of process control equipment 510 can communicate by the exchange of electrical signals that correspond to instructions defined by the manufacturer of the process control equipment 510. In some cases these instructions are proprietary, and in some cases manufacturers have agreed to some standard set of instructions. An example of a first piece of process control equipment can be a sensing device that counts or examines a first type of part (such as a wheel) that passes through a workstation. Another example of the process control equipment is a mass flow controller that both measures and controls the flow of a fluid in a chemical process. Another computer 506 is identified as "OPC Server B." This other computer 506 has a connection to a second piece of process control equipment 512, to which it can send instructions and from which it can obtain information. The computer 506 and the second piece of process control equipment 512 can also exchange instructions and information as electrical signals. An example of a second piece of process control equipment can be a sensing device that counts a second type of part (such as a chassis to which four wheels are attached). Another example of the process control equipment is a power controller that controls the temperature of a chemical reactor. The second controller can request information from the first in order to maintain its process control parameters at the levels needed to keep the process running correctly.

In general, at the present time, direct exchanges of instructions and information are not possible between process control equipment made by different manufacturers. In fact, in some cases, the exchange of instructions and information is not possible even between equipment made by the same manufacturer. In the present embodiment, if information created at the first process control equipment 510 needs to be communicated to the second piece of process control equipment 512, computer 502 can obtain the information from the first piece of process control equipment 510 and can transmit that information via the OPC communication protocol to another computer 504 that is in the network, and that is running the appropriate software according to the invention. A commercial embodiment of the software is known as DataWorx32, as indicated above. DataWorX32 is a product of ICONICS, Inc. of 100 Foxborough Boulevard, Foxborough, Mass. The computer 504 can then transmit the received information, using the OPC communication protocol, from itself to the computer 506 that communicates with the second piece of process control equipment 512. Finally the computer 506 can communicate the information to the second piece of process control equipment 512, using either a proprietary communication protocol or a standard communication protocol. Additional computers, such as the computer 508, that is a "client" that is connected to the network, but that is not involved in the specific communication under discussion, can be part of the network, and can at other times be involved in other communications according to the invention.

For the communication just described, the computer 504 upon which the DataWorX32 program is operating views as input the data transmitted to it by the computer 502, and views as output the information it send to the computer 506. The computers 502, 504, 506, 508 can be made by different manufacturers, can be of different types, and can operate under different operating systems, so long as they all communicate according to a standard communication protocol for process control, which in this embodiment is OPC. In order for a computer to communicate under the OPC protocol, it must have an OPC-compliant interface available in its operating system. Under the Windows operating systems, for example, an OPC-compliant Dynamic Link Library ("DLL") file is sufficient to communicate in an OPC system.

In an equivalent manner, data that the second piece of process control equipment 512 requires about the first piece of process control equipment 510 can be provided to the process control equipment 512. To accomplish this communication, the user sets up DataWorX32 to take information out of 510 (on a polling basis, e.g., every 50 ms) and then to send it to 512. The information is supplied when it represents a significant change in the parameter of interest. A request can be handled between the piece of process control equipment 512 and the computer 506 in the proprietary language of the equipment 512, and can signal, for example, that an error condition has occurred. Such a request will traverse the computer network via computers 506, 504 and 502, once again in the format defined by the standard communication protocol for process control. At the other end, the request can be handled between the piece of process control equipment 510 and the computer 502 in the proprietary language of the equipment 510. The information will flow along the same path, but in the opposite direction. In another embodiment, there can be multiple instances of the DataWorX32 program each running on a different computer.

The information that is transferred between a piece of process control equipment and a computer, or between two computers, can be anything that can be represented by electrical signals, and can include process control parameters as a subset. In general, a process control parameter is a datum (e.g., time, date, temperature, pressure, volume, mass, units of measure, rate of change, measured or computed quantity, alphanumeric string, symbol, etc.), a status of equipment, a status of a process, an identifier of equipment, an identifier of a process, an identifier of a processing batch, a mathematical or logical relationship, and the like.

When a portable computing device 250 is directly connected to the network 500, for example in place of computer 508 or in addition to computer 508, or is connected so that it can communicate via wireless or infrared ("IR") communication channels or the like with a suitable communication port (not shown) attached to the network 500, the portable computing device 250 can receive process control information in order to monitor a process, and it can transmit process control information so as to control a process.

Figure 6:
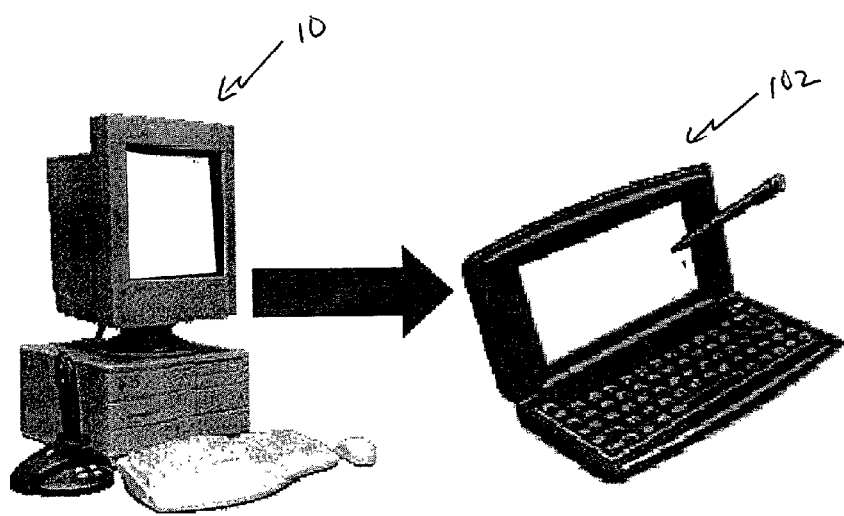
FIG. 6 depicts an embodiment of the invention in which a software object is developed on a computer such as a desktop that uses a first operating system, and the software object is then transferred to a portable computing device, such as a handheld computer, that uses a second operating system having less capability than the first operating system.

FIG. 6 depicts an embodiment of the invention in which a software object is developed on a computer 10 such as a desktop that uses a first operating system, and the software object is then transferred to a portable computing device, such as a handheld computer 102, that uses a second operating system having less capability than the first operating system. In one embodiment, the computer 10 is using Windows 95/98/NT/2000, and the handheld portable computer 102 is using Windows CE. The arrow is intended to symbolize the transfer of one or more application programs, computer files, computer data, and the like from the computer 10 to the handheld portable computer 102 by any convenient means, including direct hardwire connection, connection via a computer network, wireless transfer such as radio or telephony, transfer by an optical or infrared connection, or the fabrication or programming of a chip such as a memory chip or the recording of information on another machine-readable medium such as a magnetic medium that is transferred to the handheld portable computer 102, or any combination of such means of transferring such information from the computer 10 to the handheld portable computer 102. FIG. 6 may further be understood to be an exemplary depiction, in that the computer 10 can be any of a variety of computers such as already described that can operate a powerful operating system, and the handheld portable computer 102 could equally well be a portable computer, an embedded device, or any of a variety of computing devices that use a second, less powerful operating system than the computer 10.

Figure 7:
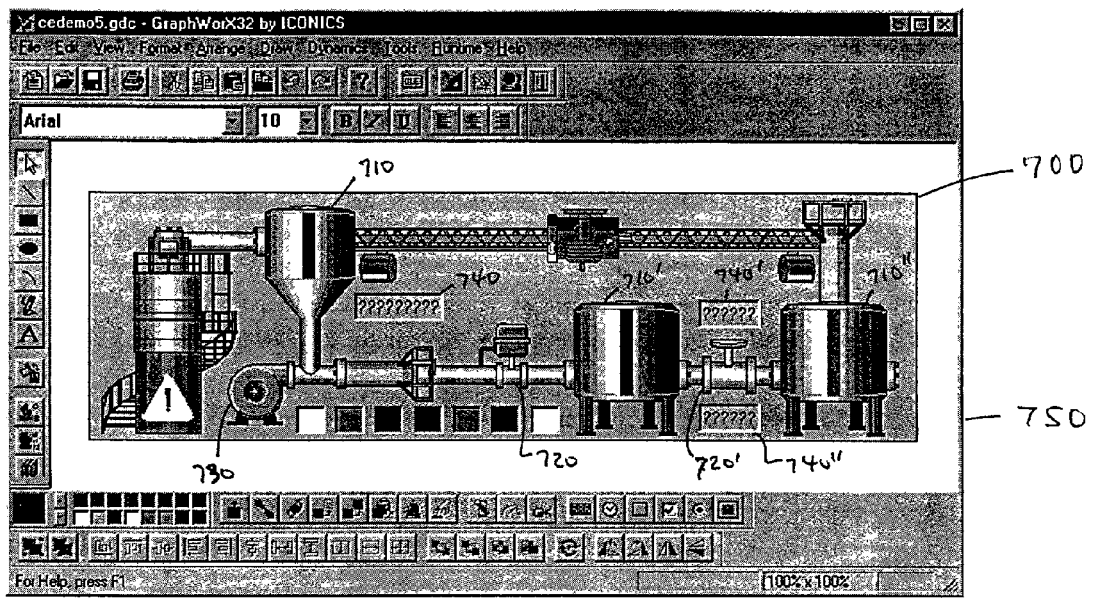
FIG. 7 depicts an embodiment of a graphical human-machine interface process control that is developed on a computer that uses a first operating system, according to the invention.

FIG. 7 depicts an embodiment of a graphical human-machine interface process control that is developed on a computer that uses a first operating system, according to the invention. The depiction shows a HMI intended to operate on a portable computing device using Windows CE as the operating system being configured on a computer 10 (not shown). The graphical human-machine interface process control can be used to control a process in real time. In this embodiment, a factory 700 that processes material, which can be a fluid, is depicted. The factory 700 includes several holding tanks or reactors 710, 710', 710", valves 720, 720', and a pump 730. Three data boxes 740, 740', 740", which can display alphanumeric information, are depicted. In configuration mode, there is no data to display, so the boxes 740, 740', 740" are shown filled with question marks. In operation, the boxes 740, 740', 740" display current information, as discussed more fully with regard to FIG. 8. The depiction of the factory 700 is contained within the development environment screen 750 that appears on a computer that uses an operating system selected from Windows 95/98/NT/2000, which computer is running the ICONICS, Inc. GraphWorX32 product utilizing the Windows CE Configuration Mode. The configuration portion of CE ToolWorX is based on an enhanced version of ICONICS' Genesis32 product line.

When the user has finished configuring the HMI, the configuration files are downloaded to the target CE device, where they will be used by CE ToolWorX's runtime engine to execute the HMI. In one embodiment, the runtime engine is known as ICONICS Pocket GENESIS. As mentioned earlier, other computer modules can also be downloaded to the target CE device, such as a handheld portable computer, or an embedded device, that permit the exchange of OPC compliant information between computing devices, and that permit the exchange of OPC compliant information between computing devices and the factory floor equipment in real time.

Figure 8:
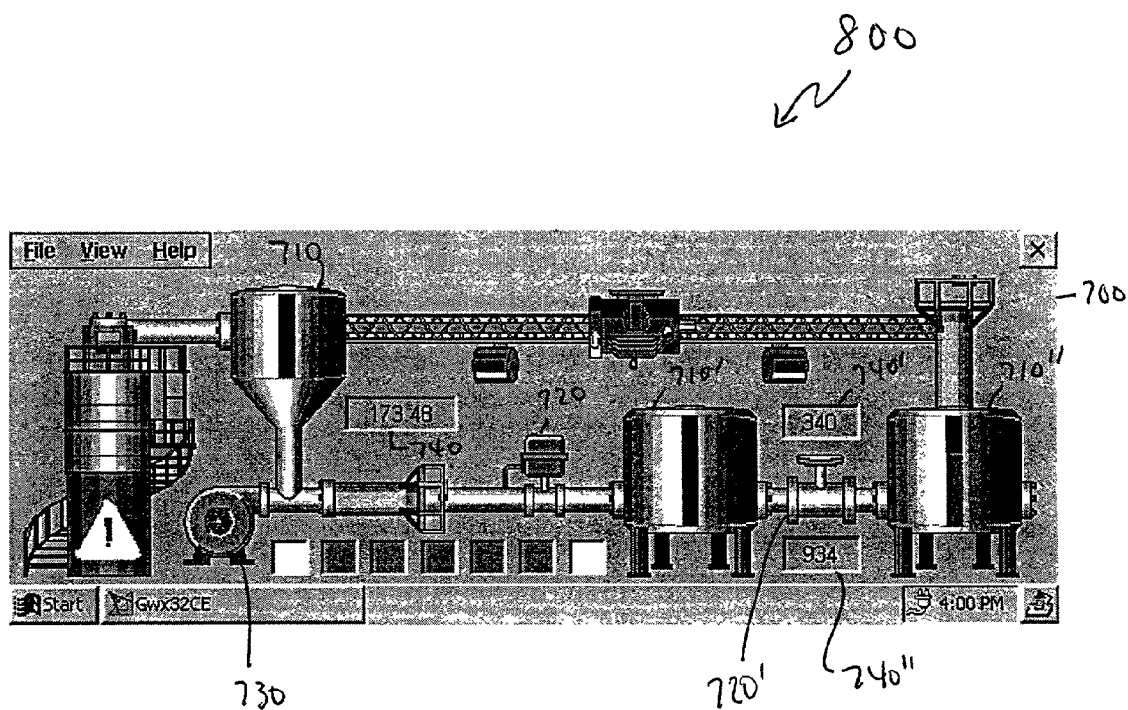
FIG. 8 depicts an embodiment of a graphical human-machine interface process control that is operated on a portable computing device such as a handheld computer that uses a second operating system having less capability than the first operating system, according to the invention.

FIG. 8 depicts an embodiment of a graphical human-machine interface process control that is operated on a portable computing device such as a handheld computer that uses a second operating system having less capability than the first operating system, according to the invention. The embodiment depicted shows an operator interface 800 developed with CE ToolWorX on a computer that used an operating system selected from Windows 95/98/NT/2000, that ran on a portable handheld device that uses the Windows CE operating system. As in FIG. 7, there is depicted the factory 700 that processes material. As in FIG. 7, the factory 700 includes several holding tanks or reactors 710, 710', 710", valves 720, 720', and a pump 730. Three data boxes 740, 740', 740", which can display alphanumeric information, are depicted. In runtime mode, there is data to display, so the boxes 740, 740', 740" are shown displaying values, which can be such process control parameters as a temperature, a pressure or a flow rate, for example. In operation, a user of the portable computing device can observe that the process control parameters are being displayed, and can determine if the parameters are acceptable or require that corrective action be taken. The user of the portable computing device can use the controls available on the device, such as buttons, a keyboard or keypad, or an input device such as a touch screen, or possibly a voice-actuated input device, in order to input a desired change in a selected process control parameter. This information is then processed and transmitted via a communication link, such as a wire, a wireless communication link such as radio or telephony, a visible or infrared link, or the like, to a computing device that has either direct control of the process control parameter, or that can communicate such information over a network to another computing device that has such control. Finally, the computer having control of the process control parameter can take the needed corrective action, and optionally can check to see that the request sent to it is acceptable, for example in that the user has authorization to make the request. The transmission of the values of the process control parameters that are displayed in the boxes 740, 740', 740" follows the same or a substantially similar path, in the opposite direction, e.g., the data is collected by the computing device having control of the process control parameter, and is sent over one or more links to the user's portable computing device, where the datum is displayed.

The runtime portion of CE ToolWorX, known as Pocket GENESIS, is based on the source code of ICONICS' PC-based HMI/SCADA (Supervisory Control and Data Acquisition) runtime software. The CE runtime includes most of the animation capabilities of its PC counterpart. Complex operator interfaces can be made for Windows CE using CE ToolWorX. In one embodiment, the HMI/SCADA runtime software includes two portions. One portion is a processor-independent runtime module that provides the interface to the user and that displays and accepts information as necessary. The second, portion is a processor-specific interface module that provides the detailed instructions required to cause a specific processor to operate in accordance with process control software and the process being controlled, e.g., to interface the processor-independent runtime module to the specific processor (or central processing unit) present in the portable computing device that is employed. In different embodiments, the ICONICS CE ToolWorX software supports embedded target microprocessors such as the Hitachi SH3/SH4, the Motorola PowerPC, MIPS microprocessors and the Intel Strong ARM and X86 family of microprocessors.

Figure 9:
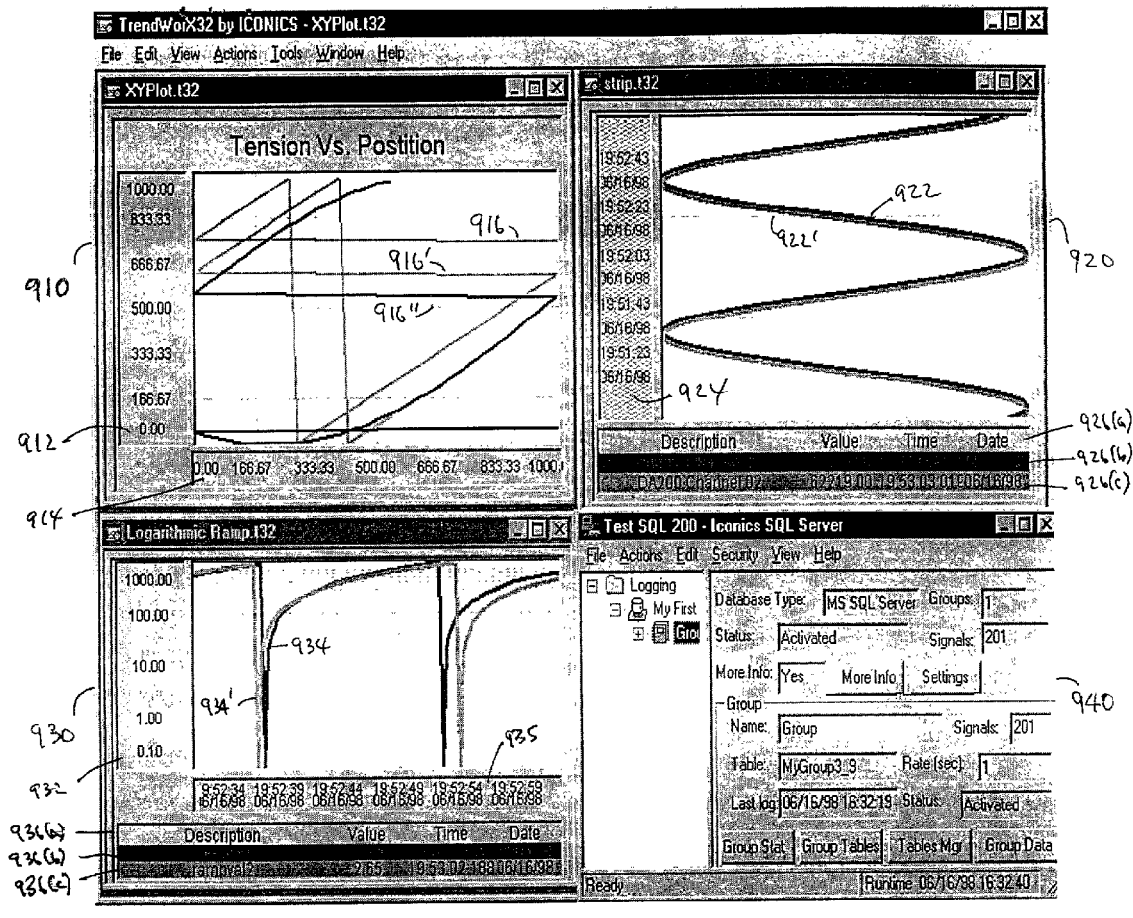
FIG. 9 depicts another embodiment of a graphical human-machine interface process control for the presentation of trend data that is developed on a computer that uses a first operating system, according to the invention.

FIG. 9 depicts another embodiment of a graphical human-machine interface process control for the presentation of trend data that is developed on a computer that uses a first operating system, according to the invention. The graphical human-machine interface is a form of graphical user interface ("GUI"). In the embodiments depicted, various forms of trend analysis and trend display software are being developed on a computer 10 (not shown) that uses an operating system selected from Windows 95/98/NT/2000. A graphical human-machine interface is shown being configured, that will allow a user employing a portable computing device that uses the Windows CE operating system to observe trend information. The development can be carried out by employing the ICONICS, Inc. TrendWorX32 product utilizing the Windows CE Configuration Mode. TrendWorX32 is a product of ICONICS, Inc. of 100 Foxborough Boulevard, Foxborough, Mass. TrendWorX32 is a powerful collection of real-time trending, historical data logging, reporting and analysis tools, which seamlessly integrates with enterprise-wide information systems. TrendWorX32 is based on the OPC Historical Data Access 1.0 specification for creating plug & play historical data servers and clients. TrendWorX32 offers an open solution to applications requiring scaleable and distributed real-time performance. In operation on a portable computing device, the graphical human-machine interface can be used to access historical information that is recorded in databases such as Microsoft's SQL, MSDE, Access and Oracle, that are stored on other computers that are connected to the network.

FIG. 9 depicts a screen 900 that includes four panes 910, 920, 930, 940 that are simultaneously displayed on the display of computer 10. Pane 910 depicts the relationship between tension and position for a number of objects (not shown), such as rods or cables. The vertical axis 912 and the horizontal axis 914 display numerical values, which in the embodiment depicted range from 0 to 1000, and the curves 916, 916', 916" present a graphical representation of three measurements on undefined objects.

Pane 920 depicts two sinusoidal curves, darker curve 922, and lighter curve 922' displayed on a simulated strip chart recorder. The vertical axis 924 displays a time and date for each horizontal line on the simulated graph paper of the simulated strip chart recorder. The simulated paper moves from the top of pane 920 to the bottom. The horizontal lower border of pane 920 displays the titles, "Description," "Value," "Time," and "Date" in line 926(a), and the values for these descriptors corresponding to curves 922 and 922' in lines 926(b) and 926(c), respectively.

Pane 930 depicts another strip chart recorder having a logarithmic vertical axis 932, that spans 4 decades, from 0.1 to 1000 in value. Two logarithmic curves, darker curve 934, and lighter curve 934' are displayed on this simulated strip chart recorder, in which the simulated paper moves from right to left. The horizontal axis 935 displays a time and date for each vertical line on the simulated graph paper of the simulated strip chart recorder. The horizontal lower border of pane 930 displays the titles, "Description," "Value," "Time," and "Date" in line 936(a), and the values for these descriptors corresponding to curves 934 and 934' in lines 936(b) and 936(c), respectively.

Pane 940 depicts a dialog box that a user can employ to define the parameters for the retrieval of historical information using a structured query language ("SQL") server. Such servers are used for organizing and maintaining databases. In pane 940, there are a variety of input parameters that are sought from a user. The user can select the desired data from any MS Access, Oracle or SQL Sever containing historical information. The selected and user requested information can be filtered. The user can access instructions to carry out predefined calculations such as averaging, finding a minimum and a maximum, and performing statistical calculations.

Figure 10:
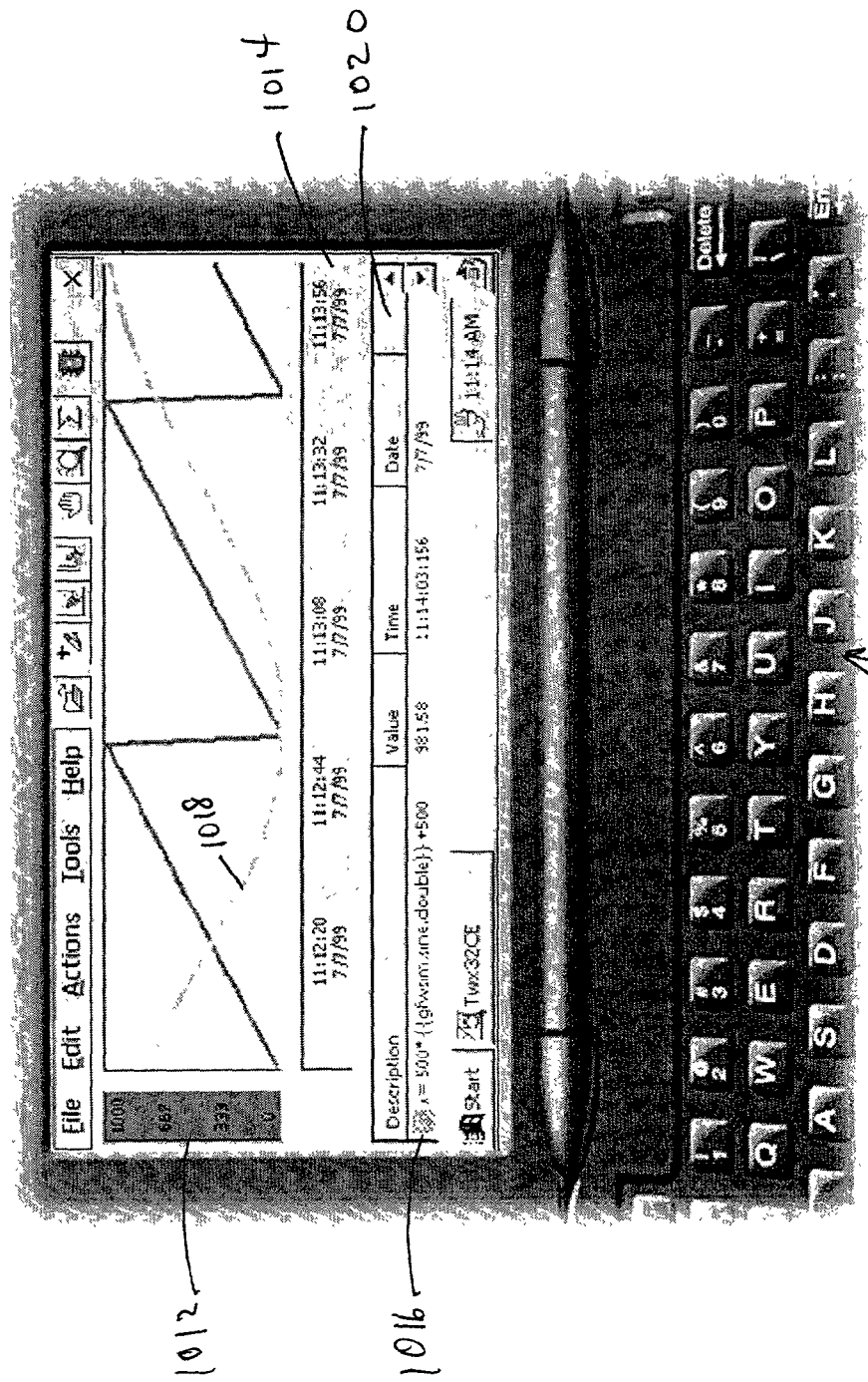
FIG. 10 depicts another embodiment of a graphical human-machine interface process control for the presentation of trend data that is operated on a portable handheld computer that uses a second operating system having less capability than the first operating system, according to the invention.

FIG. 10 depicts another embodiment of a graphical human-machine interface process control for the presentation of trend data that is operated on a portable handheld computer that uses a second operating system having less capability than the first operating system, according to the invention. The embodiment depicted shows an operator interface 1000 developed with CE ToolWorX on a computer that used an operating system selected from Windows 95/98/NT/2000, that ran on a portable handheld device that uses the Windows CE operating system. In FIG. 10, a simulated chart recording 1010 of voltage vs. time is depicted. In FIG. 10 the simulated chart paper travels from right to left, with the most recent data appearing on the right. The left axis 1012 depicts process control parameter ranges, such as a range of voltages, while the horizontal axis 1014 depicts times and dates associated with each vertical line on the simulated chart paper. The lower horizontal display 1020 depicts the defining parameter relationships for a sinusoidal voltage, 1016, that correspond to the curve 1018. FIG. 10 further depicts a portion of a handheld portable computing device 102, including a portion of the keyboard, and the display.

The embodiment depicted in FIG. 10 is based on Pocket TrendWorX, a software tool developed by ICONICS, Inc. Pocket TrendWorX is a powerful real-time trending, reporting, and analysis tool that can operate on computing devices using the Windows CE operating system. TrendWorX CE seamlessly integrates with enterprise-wide information systems providing historical data on portable computing devices 102, such as mobile and embedded devices that use the Windows CE operating system. TrendWorX is based on the OPC Historical Data Access ("HDA") specification and can operate in a "plug & play" manner with any OPC HDA historical data server. OPC HDA servers can store continuous and batch process information for the entire manufacturing enterprise. TrendWorX offers an open solution to applications requiring scaleable and distributed real-time historical replay that are intended to be used with portable, especially lightweight, computing devices that use the Windows CE operating system, and that are connected as clients in a networked system.

Figure 11:
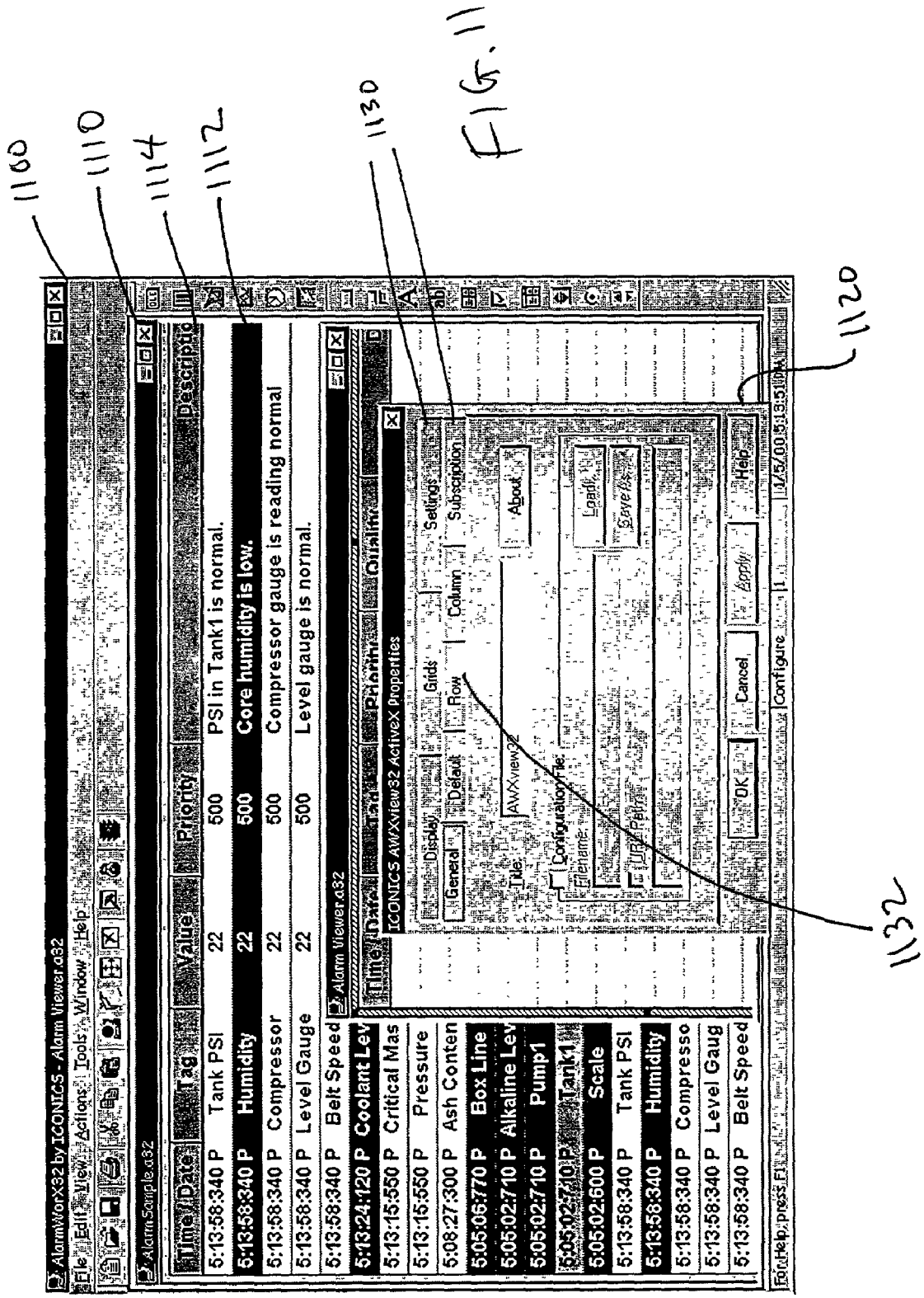
FIG. 11 depicts still another embodiment of a graphical human-machine interface process control employing alarms that is developed on a computer that uses a first operating system, according to the invention.

FIG. 11 depicts still another embodiment of a graphical human-machine interface process control employing alarms that is developed on a computer that uses a first operating system, according to the invention. The depiction shows the configuration on a computer 10 (not shown) of a HMI/SCADA (Supervisory Control and Data Acquisition) process control that is intended to operate on a portable computing device using Windows CE as the operating system. In this embodiment, the computer 10 (not shown) uses an operating system selected from the Windows 95/98/NT/2000 operating systems. In this embodiment, the ICONICS AlarmWorX32 product is being used in the Windows CE Configuration Mode.

AlarmWorX32 is a distributed enterprise wide alarm and events management system. AlarmWorX32 is an OPC compliant alarming product based on the OPC Alarm & Events 1.0 specification. It includes powerful alarm detection, sorting, filtering, viewing, logging, OPC Server, Alarm Tag Browser and much more. Alarm Configuration is easy with Alarm/Event Configuration Explorer. Alarm configurations are saved to an Access database, a SQL database or a MSDE database. FIG. 11 depicts the configuration and definition phase of creating a GUI interface for Alarming and Events Management. The user can define Alarm Schemas, which can include alarm filtering, priorities and alarm notification. This user defined Alarm Schema can be then download to the target Windows CE device, where it can be operated, as discussed below in connection with FIG. 12.

In this embodiment, FIG. 11 shows a pane 1100 that represents the viewable region of a display of computer 10 (not shown) in which three windows are present. The largest window, substantially coextensive with pane 1100, represents the configuration mode of an active instance of the ICONICS AlarmWorX32 product in the Windows CE Configuration Mode. Within pane 1100 is a smaller pane 1110 that shows an example of OPC alarms and events that are defined for the particular embodiment that is being configured. A single row 1112 of pane 1110 represents a single alarm or event that has been defined. There are sufficient number of defined alarms and events depicted in the pane 1110 that the entire pane 1110 is filled with rows. In the present embodiment, depicted in black and white, there are rows 1112 that have a dark background and light alphanumeric entries, and other rows 1112 that have light backgrounds and dark alphanumeric entries. On a display that provides color rendition, the dark background can be red, for example, to indicate an active alarm condition, and the light background can be white, for example, to indicate a normal condition. The use of a color such as red to indicate an active alarm can be effective in quickly presenting information to a user. In different embodiments, a row 1112 that indicates an alarm can be configured to flash so as to further attract attention. In another embodiment, an active alarm condition can further be announced by an audible signal such as a beep. A row 1112 can be configured by a user. The smallest pane 1120 is an interactive dialog box that allows a user to configure a single row 1112. The pane 1120 includes a series of tabs 1130 that provide access to the various configuration functions that the user can employ to define an alarm or an event, such as row 1112.

When the user activates the tab 1132 entitled "Row," a dialog box appears in which the user can enter information that defines the elements and parameters of a selected row 1112. In one embodiment, the user can define an event type, such as an alarm or a condition that can be tested. The pane 1110 that contains row 1112 includes a descriptive header 1114 that informs the user of the content and significance of entries in a row 1112. In the embodiment shown, descriptive header 1114 gives the information that a row 1112 includes a time and date, a tag, a value, a priority and a description. Using other panes (not shown), for example a pane that appears when "Row" tab 1132 is activated, the user can define the entries that comprise the information displayed in a row 1112, for example information such as the date, the time, a description of the situation that the alarm or event represents, a numerical value for a process parameter such as a temperature, a frequency of testing the condition represented by the alarm, a qualitative indication of a status such as low, acceptable, or high, and other types of information that describe a process and its status and inform a user of a condition of a process.

As an example, in the row 1112 that is indicated by the numeral 1112 in FIG. 11, the user has defined an alarm that carries the tag "humidity," that has a value at the time and date shown of 22, that has a priority value of 500, and that carries the description "Core humidity is low." In this embodiment, the user can define a priority using a numerical value as a bound, which, when exceeded either to the high or low side (as the user defines) will cause the alarm condition to be enunciated. In the embodiment shown, the alarm value for a parameter called "core humidity" is 500, and the actual value of the parameter as determined by a sensor not shown is 22. Therefore, an alarm for low humidity is triggered, and the row 1112 is shown as a dark row with light alphanumeric characters (or in color, a red row for example). The description states that the humidity reading is low, which is an example of a text warning that a user has specified for display when the alarm condition is detected.

The user can optionally define the appearance of the rows 1112 in pane 1110. For example, the user can define a background color for the display of an alarm condition, and a text color for the display of an alarm condition. The user can optionally define a text size and a font for the display of an alarm condition. The user can optionally choose whether the displayed line 1112 will flash, and whether an audible signal will be given.

Figure 12:
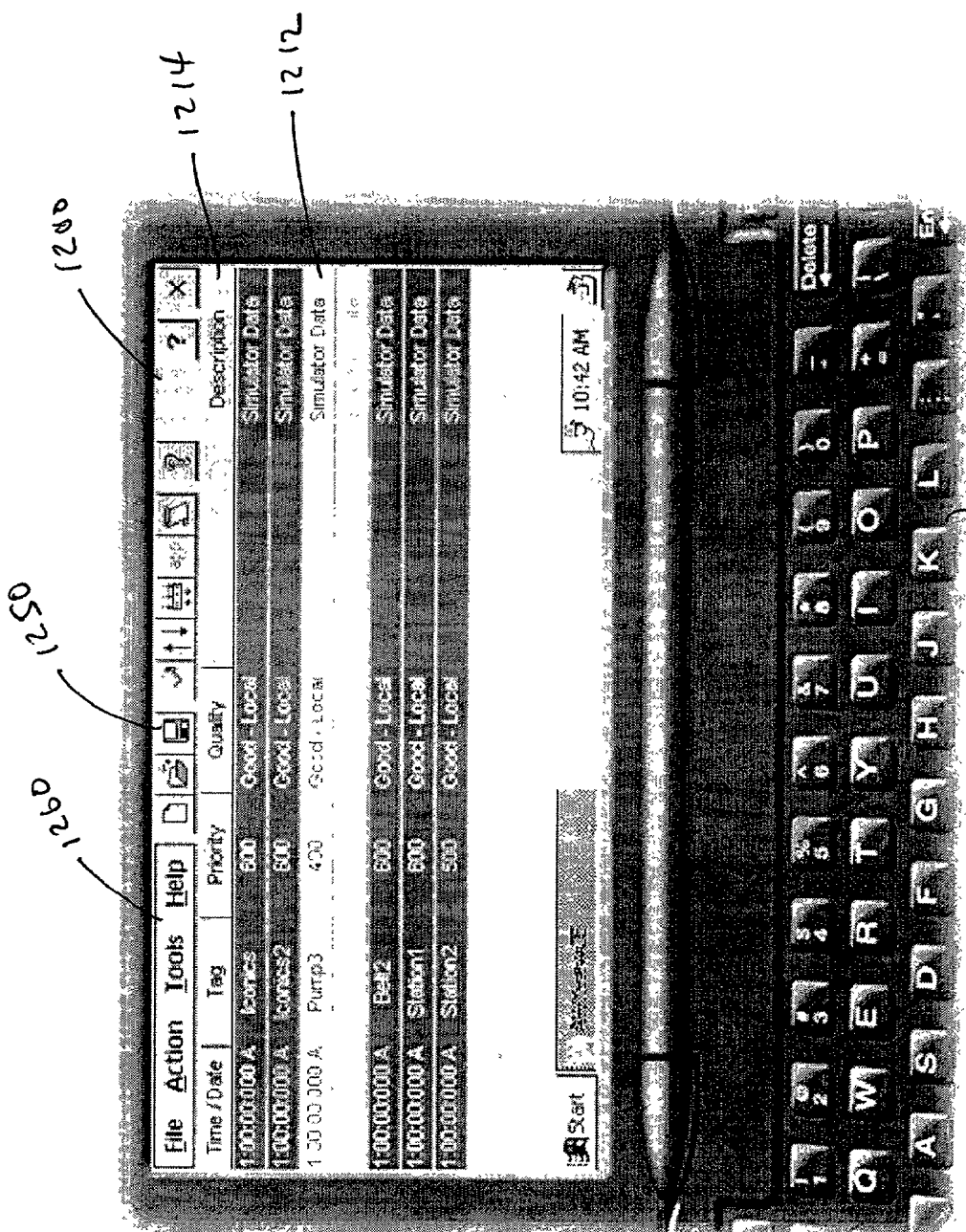
FIG. 12 depicts still another embodiment of a graphical human-machine interface process control employing alarms that is operated on a portable handheld computer that uses a second operating system having less capability than the first operating system, according to the invention.

FIG. 12 depicts still another embodiment of a graphical human-machine interface process control employing alarms that is operated on a portable handheld computer that uses a second operating system having less capability than the first operating system, according to the invention. In this embodiment, FIG. 12 shows a graphical human-machine interface that was developed with ICONICS, Inc. CE ToolWorX product operating on a computer 10 (not shown) that uses the Windows 95/98/NT/2000 operating system. The graphical human-machine interface ran on a portable computing device 102, shown in part, that used the Windows CE operating system. The graphical human-machine interface operated in conjunction with the ICONICS, Inc. product Pocket AlarmWorX CE.

Pocket AlarmWorX provides enterprise wide alarm and events management for the use with portable computing devices that use the Windows CE operating system. Any alarm can be viewed and acknowledged on locally connected or mobile portable computing devices that use the Windows CE operating system. Pocket AlarmWorX is an OPC alarm client for portable computing devices that use the Windows CE operating system. Pocket AlarmWorX is based on the OPC Alarm & Events 1.0 specification. It includes powerful alarm notification, sorting, filtering, viewing, multimedia and much more.

One can create lightweight OPC client applications on computers that use a selected one of the Windows 95/98/NT/2000 operating systems, and download the resulting client applications to portable computing devices that use the Windows CE operating system. Possible uses include such diverse applications as operating building controls, home security, automotive manufacturing, and many other manufacturing applications. Through the use of such systems, the user can be notified of an alarm condition wherever the user is physically located.

Pocket AlarmWorX applications can be used with wireless Ethernet for remote mobile capability. One can also connect to alarm summary and alarm acknowledgment capabilities. Through the use of wireless networking technology, one can connect to any OPC compliant Alarm and Event Server and view the status of alarms on portable computing devices, including mobile devices, that use the Windows CE operating system. In this embodiment, FIG. 12 depicts an alarm system that notifies a user of a portable computing device about critical and important alarm conditions. In this embodiment, the portable computing device uses the Windows CE operating system. The user can take action on the reported alarms by acknowledging these reported alarms, and can provide a command or directive to correct the condition that caused the alarm. Acknowledgments can be sent back to an alarm server hosted on a computer that is using the Windows 95/98/NT/2000 operating system.

In this embodiment, FIG. 12 shows a pane 1200 that represents the viewable region of a display of portable computing device 102. Pane 1200 shows an example of OPC alarms and events that are defined for the particular embodiment. A single row 1212 of pane 1200 represents a single alarm or event that has been defined. There are sufficient number of defined alarms and events depicted in the pane 1200 that the entire pane 1200 is filled with rows. In the present embodiment, depicted in black and white, there are rows 1212 that have a dark background and light alphanumeric entries, and other rows 1212 that have light backgrounds and dark alphanumeric entries. On a display that provides color rendition, the dark background can be red, for example, to indicate an active alarm condition, and the light background can be white, for example, to indicate a normal condition. The use of a color such as red to indicate an active alarm can be effective in quickly presenting information to a user. In different embodiments, a row 1212 that indicates an alarm can be configured to flash so as to further attract attention. In another embodiment, an active alarm condition can further be announced by an audible signal such as a beep. A row 1214 at the top of the display can provide header descriptions that give information about the meaning of the entries in a row 1212, such as the date, the time, a tag for the row 1212 of data being displayed, a priority (such as for example a numerical limit value for a process parameter), a quality for the data being displayed and the source of the data, a description of the situation that the alarm or event represents, and optionally other types of information that describe a process and its status and inform a user of a condition of a process.

The display pane 1200 can include further information and controls relating to the status and operating condition of the portable computing device 102 itself, and additional information about the operation and control of the process control software that is operating on the portable computing device 102, such as simulated buttons, for example a save button 1250 for saving a copy of a file, or a pull-down menu 1260 for controlling the actions of the software and the portable computing device 102.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of creating a graphical human-machine interface, comprising the steps of:
   (a) providing a computer using a first operating system;
   (b) providing a handheld portable computing device in communication with the computer, the handheld portable computing device using a second operating system that is less capable than the first operating system;
   (c) generating on the computer an interactive control software object that provides an interactive graphical human-machine interface when operating on the handheld portable computing device to allow control of at least one parameter of a process external to the handheld portable computing device by use of the handheld portable computing device;
   (d) simulating on the computer the operation of the interactive control software object on the handheld portable computing device; and
   (e) transferring the interactive control software object from the computer to the handheld portable computing device.

2. The method of claim 1 further comprising the steps of:
   (f) operating the interactive control software object to provide the interactive graphical human-machine interface on the handheld portable computing device; and
   (g) transmitting process control information between the computer and the handheld portable computing device.

3. A method of creating a graphical human-machine interface, comprising the steps of:
   (a) providing a computer using a first operating system;
   (b) providing a handheld portable computing device in communication with the computer, the handheld portable computing device using a second operating system that is less capable than the first operating system;
   (c) generating on the computer an interactive control software object that provides an interactive graphical human-machine interface when operating on the handheld portable computing device to allow control of at least one parameter of a process by use of the handheld portable computing device, the interactive control software object being processor-independent and the computer further comprising a run-time engine specific to a selected processor present on the handheld portable computing device;
   (d) simulating on the computer the operation of the interactive control software object on the handheld portable computing device; and
   (e) transferring the interactive control software object from the computer to the handheld portable computing device.

4. A computer program recorded on a machine-readable medium, comprising:
   (a) a module that operates on a computer to allow a user of the computer to generate an interactive control software object that provides an interactive graphical human-machine interface when operating on a handheld portable computing device to allow control of at least one parameter of a process external to the handheld portable computing device by use of the handheld portable computing device, the computer using a first operating system and the handheld portable computing device using a second operating system having less capability than the first operating system;
   (b) a module that operates on the computer to simulate the operation of the interactive control software object on the handheld portable computing device; and
   (c) a module that operates on the computer to transfer the interactive control software object from the computer to the handheld portable computing device.

5. The computer program of claim 4, further comprising:
   (d) a module that operates on the computer to transfer, between the computer and the handheld portable computing device, information related to the operation of the process.

6. The computer program of claim 4 wherein the interactive control software object comprises a processor-independent interactive graphical human-machine interface object and a run-time engine specific to a selected processor.

7. A method of controlling a process, comprising the steps of:
   (a) providing a computer using a first operating system;
   (b) providing a handheld portable computing device in communication with the computer, the handheld portable computing device using a second operating system that is less capable than the first operating system;
   (c) providing an interactive control software object that provides an interactive graphical human-machine interface when operating on the handheld portable computing device, the software object generated on the computer;
   (d) operating the interactive control software object on the handheld portable computing device to provide the interactive graphical human-machine interface on the handheld portable computing device; and
   (e) exchanging information between the computer and the handheld portable computing device, to control at least one parameter of the process, the process being external to the handheld portable computing device, by use of the interactive human-machine interface provided by operation of the object on the handheld portable computing device.

8. The method of claim 7 wherein step (d) comprises operating the interactive control software object on the handheld portable computing device to display both graphical information and alphanumeric information.

* * * * *